United States Patent [19]
Nishii

[11] Patent Number: 5,267,301
[45] Date of Patent: Nov. 30, 1993

[54] DATA COMMUNICATION APPARATUS AND METHOD CAPABLE OF DISCRIMINATING CALLING STATIONS

[75] Inventor: Teruyuki Nishii, Yokohama, Japan

[73] Assignee: Canon Kabushiki Kaisha, Tokyo, Japan

[21] Appl. No.: 930,448

[22] Filed: Aug. 19, 1992

Related U.S. Application Data

[63] Continuation of Ser. No. 360,061, Jun. 1, 1989, abandoned.

[30] Foreign Application Priority Data

Jun. 29, 1988 [JP] Japan .................. 63-161544

[51] Int. Cl.$^5$ ............... H04M 11/00; H04N 1/32
[52] U.S. Cl. ........................ 379/93; 358/438
[58] Field of Search ............... 379/93, 96–98, 379/67, 68, 102, 100, 104, 105, 70, 74, 77, 79, 80; 381/42, 46, 47; 358/400, 434–436, 438, 439

[56] References Cited

U.S. PATENT DOCUMENTS

| | | | |
|---|---|---|---|
| 3,873,772 | 3/1975 | Dumler | 379/80 |
| 4,281,218 | 7/1981 | Chuang et al. | 381/46 |
| 4,667,065 | 5/1987 | Bangerter | 381/46 |
| 4,717,967 | 1/1988 | Yoshida | 379/100 |
| 4,800,439 | 1/1989 | Yoshino | 379/100 |
| 4,811,385 | 3/1989 | Watanabe | 379/100 |
| 4,815,121 | 3/1989 | Yoshida | 379/100 |
| 4,821,312 | 4/1989 | Horton et al. | 379/97 |
| 4,868,865 | 9/1989 | Ogawa | 379/100 |
| 4,901,343 | 2/1990 | Yamaguchi | 379/100 |
| 4,916,607 | 4/1990 | Teraichi et al. | 379/100 |
| 4,939,772 | 7/1990 | Goto | 379/100 |

FOREIGN PATENT DOCUMENTS

| | | | |
|---|---|---|---|
| 2321219 | 3/1977 | France | 379/93 |
| 58-120371 | 7/1983 | Japan | 379/100 |
| 60-259058 | 12/1985 | Japan | 379/100 |
| 0199158 | 9/1987 | Japan | 379/100 |
| 0084965 | 3/1989 | Japan | 379/100 |
| 8707802 | 12/1987 | World Int. Prop. O. | 379/100 |

Primary Examiner—Wing F. Chan
Attorney, Agent, or Firm—Fitzpatrick, Cella, Harper & Scinto

[57] ABSTRACT

A data communication apparatus/method discriminates whether a calling station is a data communication terminal or a voice terminal by sampling information on the communication line to obtain frequency data relating to that information, and summons an operator at the destination to let the operator answer when it is discriminated that the calling station is a voice terminal.

15 Claims, 7 Drawing Sheets

DATA COMMUNICATION APPARATUS AND METHOD CAPABLE OF DISCRIMINATING CALLING STATIONS

This application is a continuation of application Ser. No. 07/360,061 filed Jun. 1, 1989, now abandoned.

BACKGROUND OF THE INVENTION

Field of the Invention

The present invention relates to a data communication apparatus and method, and especially relates to a data communication apparatus and method which provide the ability to switch between data communication and voice communication.

Related Art

A conventional facsimile apparatus is used with a telephone to enable both voice communication and data communication.

In the case where one communication line is used for both the voice communication and the data communication, the facsimile apparatus is usually set in a manual receiving mode. When a call is received, an operator picks up and listens to a handset to make sure whether it is a person or a facsimile apparatus which is calling. If the calling station is a telephone, i.e., if a person is calling, the operator engages in conversation. If the calling station is a facsimile apparatus, the operator sets the apparatus to a data-communication mode.

Thus, in a conventional apparatus, the operator has to confirm whether it is a person or a facsimile apparatus calling. Especially, if the line is used with the facsimile apparatus more frequently than with the telephone, it is extremely inefficient.

SUMMARY OF THE INVENTION

A purpose of the present invention is to provide a data communication apparatus/method which overcomes the above-mentioned shortcomings.

According to one aspect of the present invention, a data communication apparatus and method are provided by means of which it is possible to discriminate whether voice communication or data communication is established when the call is received, by detecting noise on the communication line.

According to another aspect of the present invention, a data communication apparatus and method are provided in which a frequency of an input signal is measured by means of detecting a standard tonal-procedure signal which is used in data communication, and in which voice is detected by normalizing the detected tonal signal data, and which selects data communication or voice communication in accordance with whether the input signal from the calling station is a voice signal or not.

According to another aspect of the present invention, a data communication apparatus and method are provided which enable one to operate both a sending means for sending a procedure signal used in data communication and a discriminating means for discriminating whether the input signal is a voice signal or not, simultaneously.

The foregoing summary of certain advantageous features of the invention is provided in order that the detailed description of the preferred embodiments thereof that follows may be better understood, and in order that the present contribution to the art may be better appreciated. There are, or course, additional features of the invention that will be described in that detailed description with reference to the accompanying drawings. Those skilled in the art will appreciate that the conception upon which this disclosure is based may readily be utilized as a basis for designing other structures or methods for carrying out the purposes of the invention. It will be understood what the claims are to be regarded as including such other constructions and methods as do not depart from the spirit and scope of the invention.

DETAILED DESCRIPTION OF THE PREFERRED EMBODIMENTS

Figure 1:
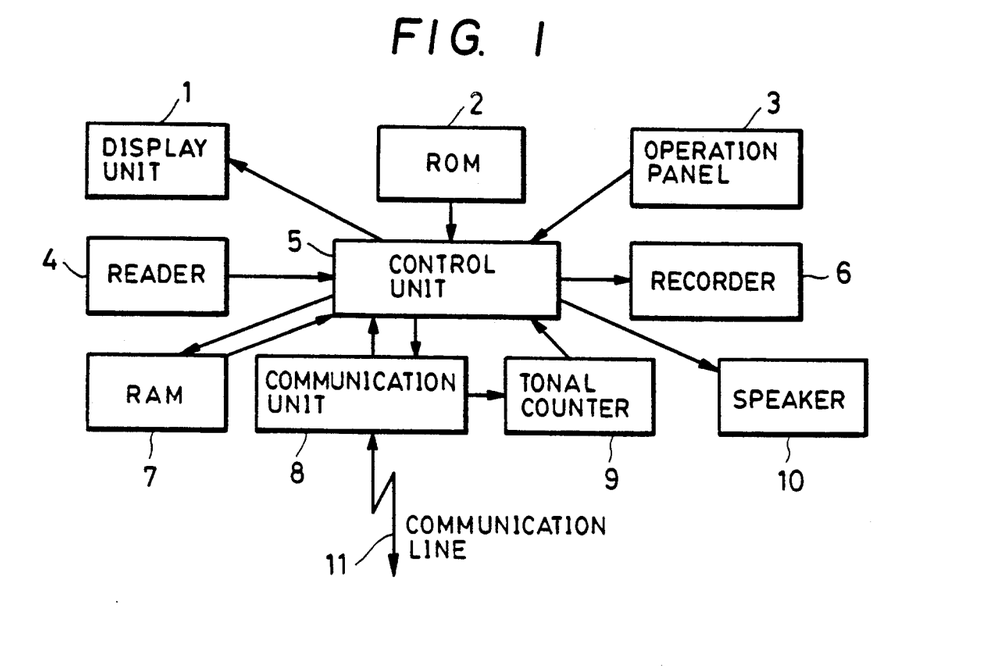
FIG. 1 is a block diagram showing a structure of a facsimile apparatus according to a first preferred embodiment of the invention.

The facsimile apparatus shown in FIG. 1 includes a control unit or controller 5 which is structured to have a micro-processor, and which controls the whole facsimile apparatus in accordance with a program stored in a ROM 2.

The controller 5 lets a communication unit 8 catch a line 11 and checks a procedure signal when a call is received. Then the controller 5 lets a tonal counter 9 receive a tonal signal. As a result, when the controller 5 recognizes that the calling station is a facsimile apparatus, the controller 5 encodes image data read by a reader 4 and transmits the coded image data via the communication unit 8, during a transmission operation, or receives the image data via the communication line 11 and the communication unit 8 and decodes the image data to be printed out by a recorder 6, during a receiving operation.

On the other hand, when the controller 5 recognizes that a person is on the line, the controller 5 activates a speaker 10, and makes a display unit 1 display a message, e.g., "PLEASE, ANSWER THE PHONE" to inform the operator of the called station that a person is calling to have a conversation.

Figure 3:
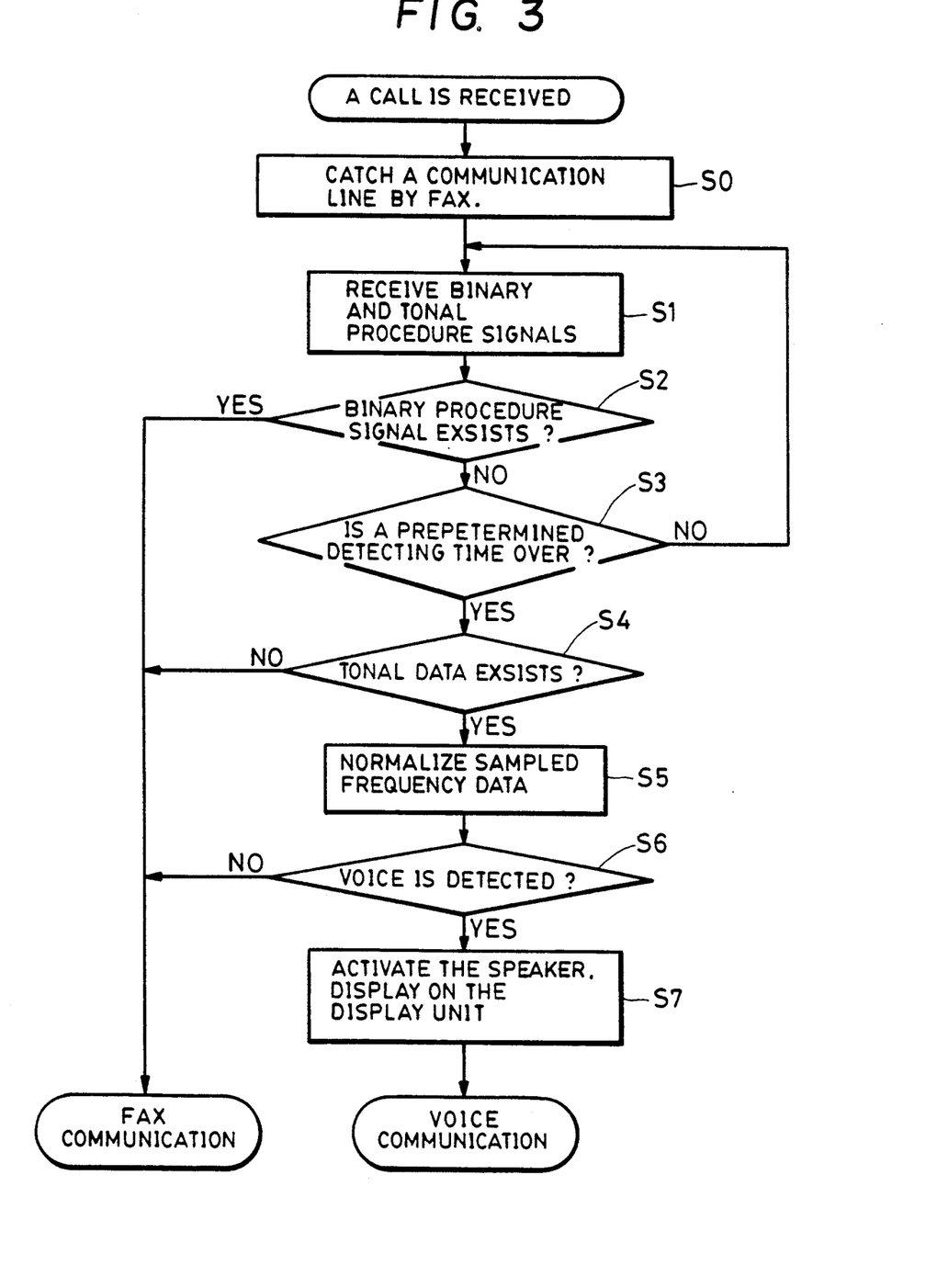
FIG. 3 is a flow chart illustrating a control operation of a controller in the first embodiment.

The above-mentioned processes are explained more concretely as follows referring to the flow chart in FIG. 3 illustrating the control operation of the controller 5 of the first embodiment.

Initially, when the controller 5 of the called station detects a call signal on the line 11 via the communication unit 8, the controller 5 makes the communication unit 8 catch the line 11, and sets a receiving mode for receiving an input signal on the line 11 (S0).

Figure 8:
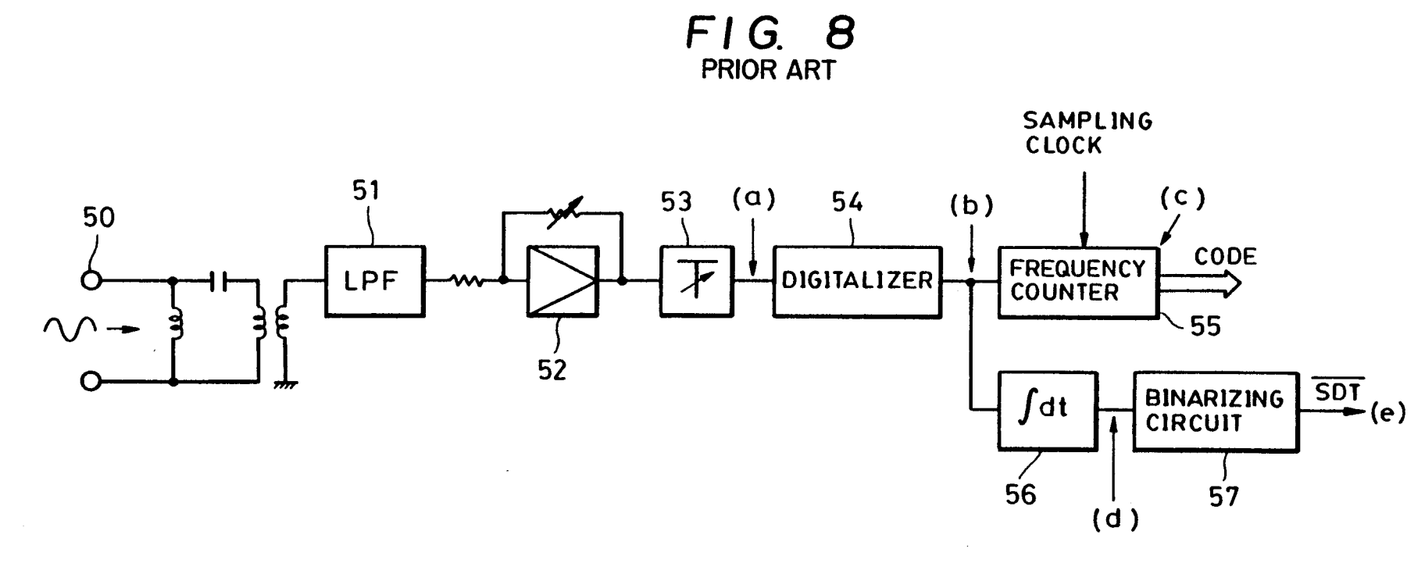
FIG. 8 is a block diagram showing a well known tonal counter.
Figure 9A:
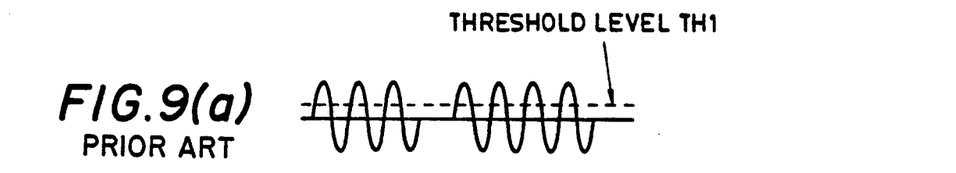
FIGS. 9a to 9f are timing charts showing a plurality of signal waveforms at various locations in the tonal counter.
Figure 9B:
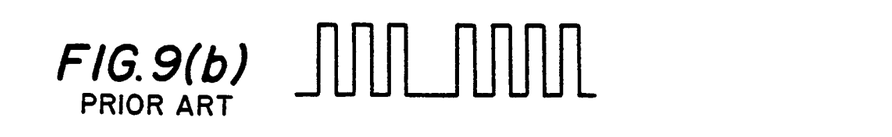
Figure 9C:
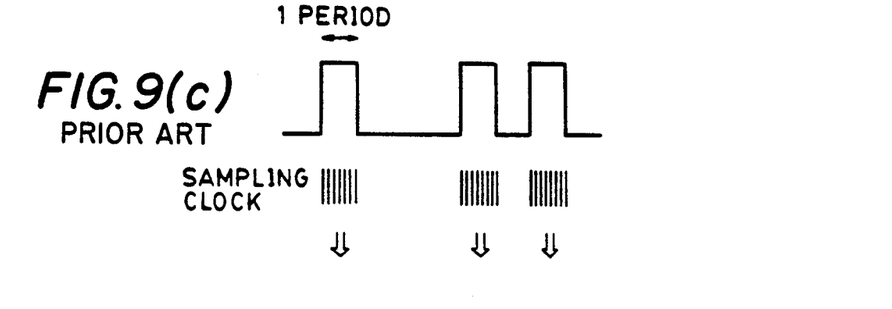
Figures 9D, 9E:
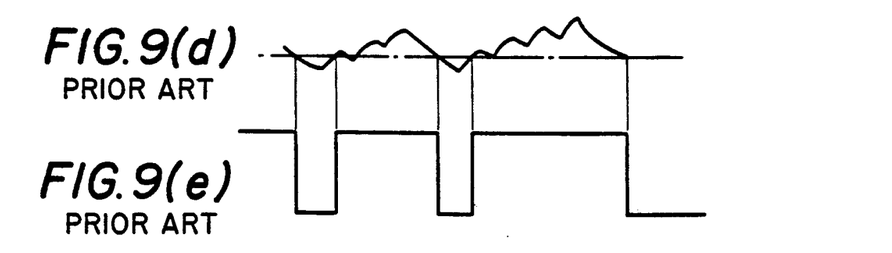
Figure 9F:
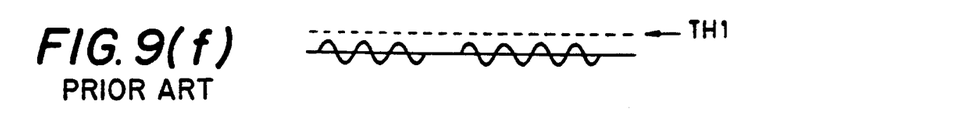

In step S1, the controller 5 checks a binary procedure signal for a predetermined period. If the controller 5 detects the binary procedure signal, the controller 5 processes the facsimile communication, because the calling station is a facsimile apparatus. Also in step S1, the controller 5 checks the tonal procedure signal and voice, which are detected by a tonal counter 9. The tonal counter 9, as well known, is structured as shown in FIG. 8. The input signal on the line 11 is input to input terminals 50, and is filtered by a low-pass filter 51. The input level of the signal is adjusted by an absolute level adjuster 52 and a variable level adjuster 53 to get a signal (a). The adjusted input signal (a) is digitized with a threshold level TH1 by a digitizer 54 to get a signal (b). The digitized signal (b) is input to a frequency counter 55 and a integrating circuit 56. The frequency counter 55 counts a number of sampling clocks falling in one period, shown a signal (c) of a frequency of the input signal. The counted number of sampling clocks is converted to a code, and then the code is output to the controller 5 as frequency data relating to the input signal.

The integrating circuit 56 integrates the digitized signal (b) to check whether energy is present on the line 11 or not. If the level of the input signal is extremely low, as shown in signal (f) (see FIG. 9), the output level of the integrating circuit 56 is low, and a binarizing circuit 57 outputs an inversion of a signal-energy-detect signal SDT, which is shown in FIG. 9 as signal (e).

As described above, the tonal counter 9 is structured to check the frequency of the input signal and the energy level on the line 11.

The frequency band from 300 Hz to 3.4 kHz of the input signal to be detected is divided into a plurality of areas. For example, a tonal procedure signal GC2, which is a command signal to command use of the G2 mode, has a frequency of 2100 Hz. Therefore, one divided frequency band is set from 2000 Hz to 2200 Hz by taking account of several conditions during transmission with error at the transmission side.

Counters corresponding to the divided areas respectively are set in a RAM 7 (see FIG. 1). The controller 5 discriminates which divided area the frequency data detected by the tonal counter 9 corresponds to, and the counter corresponding to the detected frequency data is incremented.

After the frequency data has been detected a predetermined number of times, or after a predetermined checking time is finished, the controller 5 discriminates whether the tonal procedure signal or a voice signal exists on the line 11 in accordance with a distribution state, or a histogram, of the detected frequency data.

Figure 4:
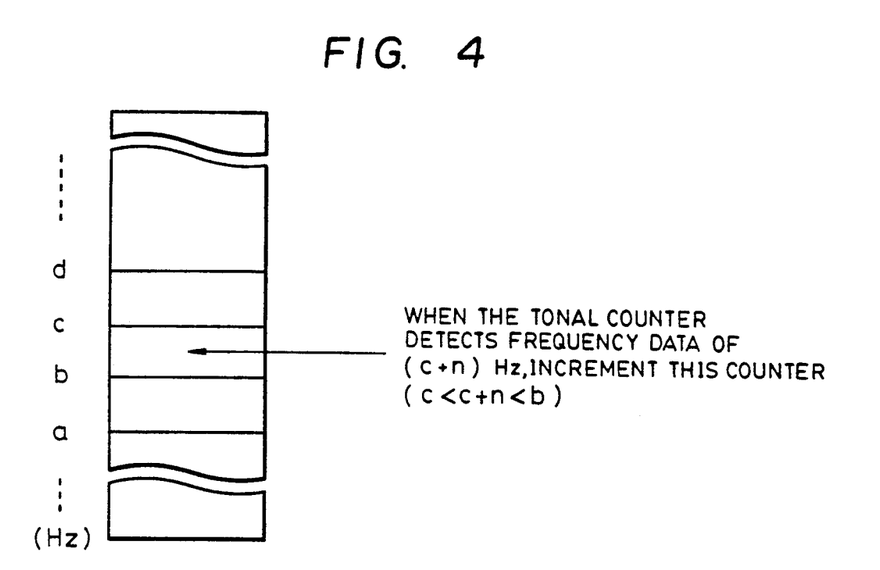
FIG. 4 is a drawing showing a map of a RAM in the first embodiment.
Figure 5A:
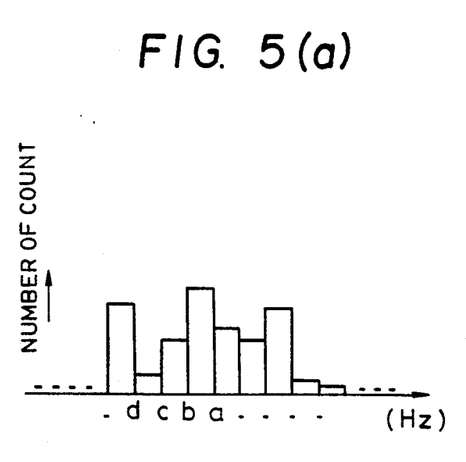
FIGS. 5a and 5b are drawings showing examples of distribution of sampled frequency data by a tonal counter in the first embodiment.
Figure 5B:
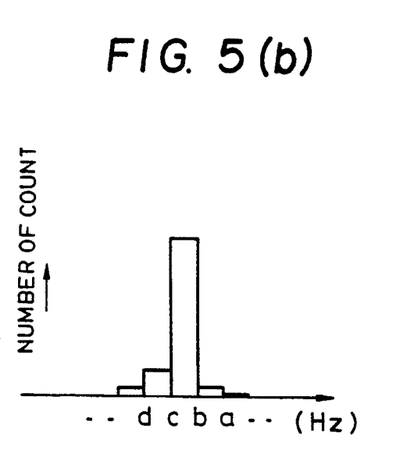

FIG. 4 shows the structure of the counters in the RAM 7, and FIGS 5(a) and 5(b) shows examples of the frequency distribution. In FIGS. 4, 5(a) and 5(b), the magnitude relationships among a, b, c, d and n are $a > b > c > d$, and $n < b - c$. During the checking time, each time additional frequency data is obtained, the counter in the RAM 7 corresponding to the newly-obtained frequency data is incremented or decremented.

After the checking time is terminated, the contents of the counters in the RAM 7 are checked by the controller 5. If the frequency distribution is spread out, and the detected rate of one frequency area is lower than a predetermined rate, which detects a single tonal signal considering several conditions during transmission, as shown in FIG. 5(a), the controller 5 discriminates that the input signal on the line 11 represents a voice.

On the other hand, if the detected rate of one frequency area is higher than the predetermined rate which is the standard to detect the single tonal signal, as in FIG. 5(b), the controller 5 discriminates that the calling station is a facsimile apparatus, and performs data communication in response to the detection of the tonal procedure signal having the detected frequency component.

In this embodiment, count values of the counters corresponding to all the frequency areas are normalized with sums of all the count values as a population to detect the rate of the specified frequency data in step S5 in FIG. 3.

The bandwidth of each frequency area and the mentioned predetermined rate may be fixed, but it may instead be arranged that these values are set by means of a keyboard on an operation panel 3, by the operator.

As a result of the above-mentioned checking, if the level of signal energy on the line is low or no tonal signal is on the line during the checking period, the controller 5 moves to the facsimile-communication procedure because the controller 5 discriminates that the calling station is a facsimile apparatus and waits for response from the called station, in step S4.

In this embodiment, especially regarding step S4, if the controller 5 does not clearly decide whether the calling station is a facsimile apparatus or a telephone, the controller 5 gives priority to facsimile communication over voice communication.

If it is discriminated in step S4 that the tonal signal is detected during the checking time, the controller 5 checks the frequency distribution by normalizing the detected data in step S5 as mentioned above. In step S6, the controller 5 discriminates that a person is on the line at the calling station when a voice signal is detected, and discriminates that the calling station is a facsimile apparatus when the tonal procedure signal is detected.

Accordingly, if the controller 5 recognizes the tonal procedure signal, the controller 5 moves to facsimile-communication procedure, and if the controller 5 recognizes a voice signal, the controller 5 activates the speaker 10 or other device to output an appropriate sound, e.g., the ringing of a bell, and outputs the message "PLEASE, ANSWER THE PHONE" to the display unit 1 to be displayed to inform the operator that a person is on the line at the calling station in step S7.

Instead of the controller 5 activating the speaker 10, the controller 5 may activate a ringing signal generator 12 so that the bell (or the like) of a telephone 13 (see FIG. 2) rings, which achieves the effect of summoning the operator, even if the facsimile apparatus is some distance from the telephone 13.

Furthermore, if the controller 5 is unable to determine with certainty whether a facsimile apparatus or a person is on the line at the calling station, the controller 5 may cause the speaker 10 to output the signal on the line, to enable the operator to listen to that signal. Accordingly, the operator can discriminate the nature of the incoming signal even when the controller cannot do so. This reduces the possibility of error.

As mentioned above, the facsimile apparatus of the first embodiment checks the received signal on the line using the tonal counter, normalizes the frequency data, and discriminates automatically whether a facsimile apparatus or a person is on the line at the calling station. Accordingly, the operator need not pick up the handset of the telephone to check whether the calling station is a voice terminal or a facsimile terminal, every time a call is received. Therefore the communication line can be used more effectively, i.e., with less wasted time. Further, since the tonal counter, the speaker and the ringing signal generator are installed even in conventional facsimile apparatus, the cost of making a facsimile apparatus with the above-described operation is no higher than that of a conventional facsimile machine.

Figure 6:
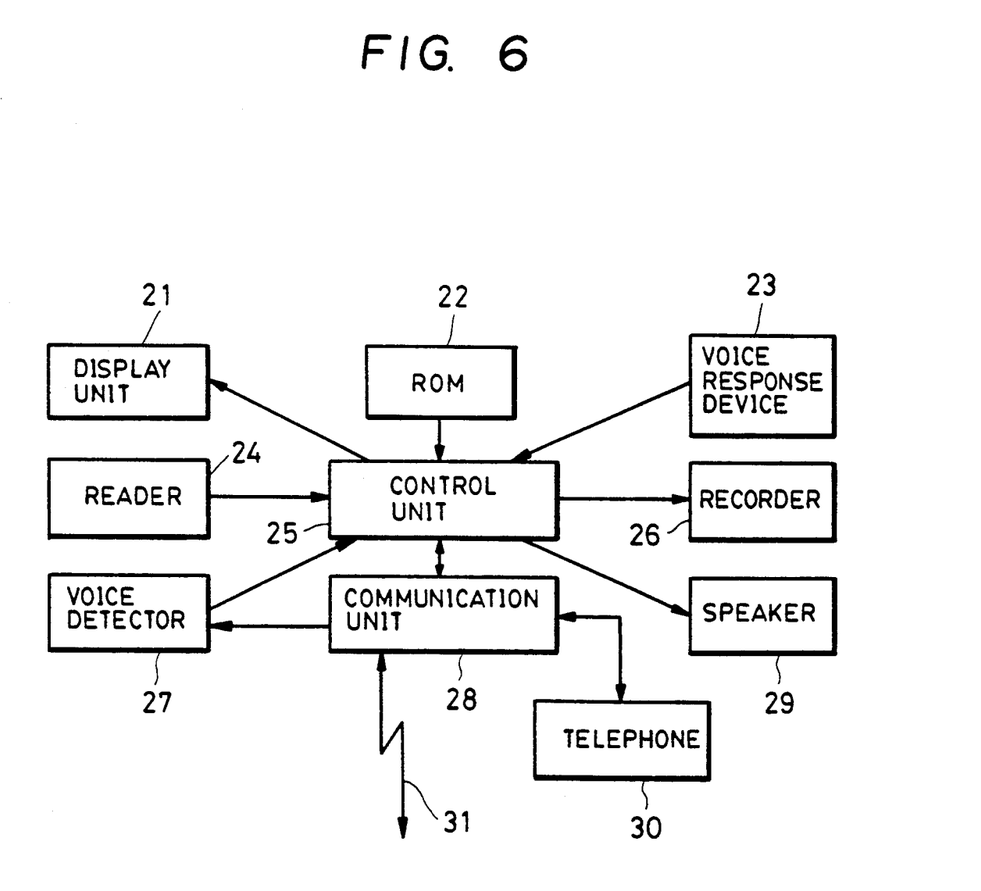
FIG. 6 is a block diagram showing a structure of a facsimile apparatus according to a second preferred embodiment of the invention.

The explanation of a second embodiment is as follows:

FIG. 6 is a block diagram showing the structure of a facsimile apparatus of the second preferred embodiment. A control unit or controller 25 including a microprocessor is provided to control the whole apparatus according to a program stored in a ROM 22. When a call is received via a communication unit 28, the controller 25 causes the communication unit 28 to catch and keep a communication line 31, and the controller 25 lets the communication unit 28 transmit the facsimile procedure signal to the line 31 while the controller 25 checks the procedure signal and voice on the line 31. If neither a procedure signal nor a voice signal is detected during a predetermined time, the controller 25 causes the communication unit 28 to release the line 31, and the controller 25 goes back to a standby state.

If a procedure signal which shows that the calling station is in the receiving state is detected during the predetermined time, the controller 25 goes to a transmitting mode for transmitting image data. In the transmitting mode, the controller 25 causes a reader to read an original document which is to be sent, encodes the read image data, and transmits the coded image data to the calling station via the communication unit 28 and the line 31.

If a procedure signal which shows that the calling station is about to transmit image data is detected, the controller 25 causes the communication unit 28 to receive the image data, decodes the received image data, and lets a recorder 26 print the decoded image data.

If the voice of a person on the line is detected by voice detector 27, the controller 25 activates speaker 29, e.g., to produce a bell sound, and causes a display unit 21 to display the message "PLEASE, ANSWER THE PHONE". Thereby, the operator can be notified that a person is on the line at the calling station and wants a voice communication.

In this case, it is more effective that the facsimile apparatus inform the calling station that the line is connected both to a facsimile apparatus and to a telephone, by means of a voice response device 23.

Figure 7:
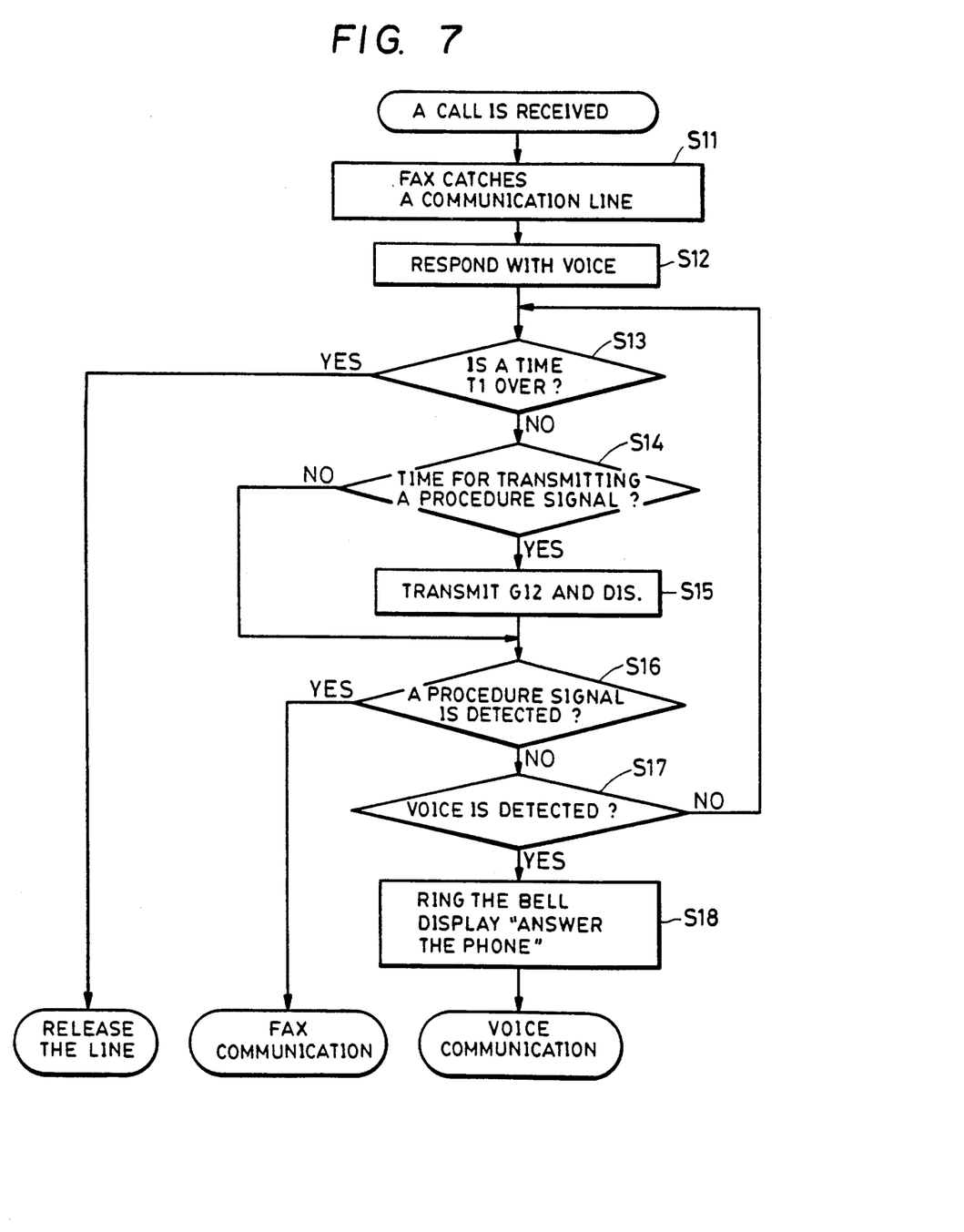
FIG. 7 is a flow chart illustrating a control operation of a controller in the second embodiment.

A more concrete explanation is as follows, referring to FIG. 7.

When the controller 25 of the called station detects the calling signal, the controller 25 causes the communication unit 28 to catch and keep the communication line 31, to assume a receiving state, in step S11.

In step S12, the voice response device 23 generates a voice message, "This line is connected to a facsimile apparatus. In order to change to a telephone, please give your name. Thank you." This message is sent to the calling station via the communication unit 28 and the line 31.

Then the controller 25 checks the response signal from the calling station in steps S16 and S17 while the controller 25 causes the communication unit 28 to send facsimile procedure signals GI2 and DIS in step S15.

If no response from the calling station is detected in step S13 during a predetermined period, which is set by a timer T1 according to the CCITT recommendation T30, the controller 25 causes the communication unit 28 to release the line 31.

If, during the predetermined period, the controller 25 recognizes the facsimile procedure signal in step S16, the controller 25 immediately starts facsimile communication to process transmission or receiving of image data.

On the other hand, when a voice signal is detected by the voice detector 27 during the predetermined period, controller 25 causes the speaker 29 to ring the bell and causes the display unit 21 to display the message "PLEASE, ANSWER THE PHONE" (S18). Thereby, the operator of the called station can be informed that a person who wants voice communication is on the line at the calling station.

Figure 2:
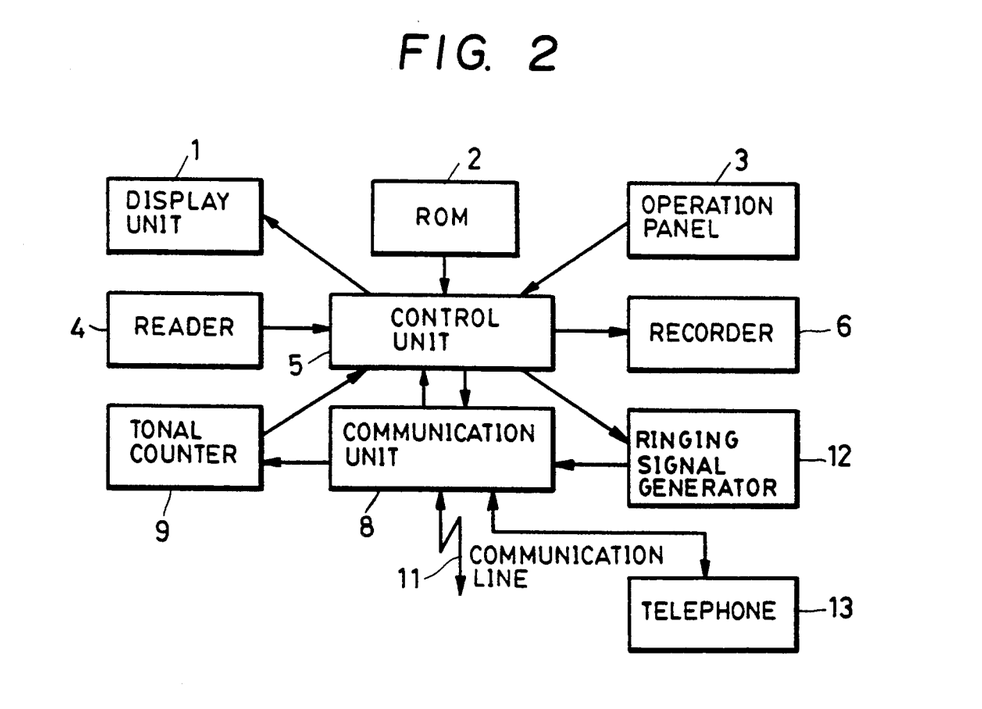
FIG. 2 is a block diagram showing a modified structure of the facsimile apparatus shown in FIG. 1.

In the above embodiment, although the controller 25 causes the speaker to ring the bell to inform the operator that it is necessary to answer the phone, if a ringing signal generator for ringing the telephone as shown in FIG. 2 is installed, the same effect can be obtained even if the facsimile apparatus is apart from the telephone.

When the voice detector 27 is structured as a conventional tonal counter, and voice is checked for by a software control as described in the first embodiment, it is not necessary to install another circuit device for that purpose. Thereby, the apparatus need not be complicated and the cost of the apparatus does not increase, even though the facsimile apparatus has the described capabilities.

As mentioned above, the facsimile apparatus of the second embodiment is structured such that the communication line is seized by the facsimile apparatus at once, the facsimile procedure signals GI2 and DIS are transmitted while the facsimile procedure signal and voice signal are checked for, and the controller causes the facsimile communication to be performed when the calling station is a facsimile apparatus, and causes the bell to inform the operator of the need to answer the telephone when a person is on the line. As a result, the operator need not confirm, by picking up the handset, that a voice call is being received, every time a call comes in.

During the predetermined period set by the T1 timer, which in this embodiment is, e.g., 35±15 seconds, the controller 25 can check for the facsimile procedure signal and for a voice signal a plurality of times. As a result, the discrimination is carried out precisely and reliably, and since the apparatus has the voice response device, the operator at the calling station is not discountenanced by hearing a facsimile signal. Further, the T1 timer is used so that it is not necessary to install another timer, and the cost of the apparatus therefore does not increase.

The first and second preferred embodiments are explained above with reference to facsimile apparatus, by way of example. However, the present invention can be applied to other data communication apparatus, for example, teletex apparatus, personal computer communication devices, and word-processor communication devices.

As mentioned above, according to the present invention, one or more communication lines can be used effectively both for data communication and for voice communication, and whether a person, a voice terminal or a data-communication terminal is at the calling station is discriminated with a simple structure.

I claim:

1. A data communication method, comprising the steps of:
   detecting a calling signal from a calling station;
   sampling information on a communication line a plurality of times to obtain frequency data relating to the information; and
   discriminating whether the calling station is a data communication terminal or a voice terminal, in accordance with a distribution of the frequency data,
   wherein, in said discriminating step, it is discriminated whether the calling station is a data communication terminal or a voice terminal, in accordance with a ratio of a number of frequency data having a predetermined characteristic to a total number of detected frequency data.

2. A data communication method, according to claim 1, further comprising the step of calling an operator when it is discriminated that the calling station is a voice terminal in said discriminating step.

3. A data communication apparatus, comprising:
   means for detecting a calling signal on a communication line;
   means for transmitting a data communication procedure signal onto the communication line in response to detection of the calling signal; and
   means for discriminating whether the signal on the communication line is a procedure signal for data communication or a voice signal for voice communication, by using a tonal counter which counts a number of times that each of a plurality of frequencies is respectively detected in the calling signal for recognizing a tonal signal of the procedure signal, wherein said transmitting means repeatedly transmits a data communication procedure signal until said discriminating means discriminates whether the calling station is a data communication apparatus or a voice terminal, during discrimination by said discriminating means, and wherein said discriminating means discriminates whether or not the calling station is a data communication terminal or a voice terminal in accordance with whether a selected one of the numbers obtained by the tonal counter exceeds a predetermined value.

4. A data communication apparatus, according to claim 3, further comprising means for notifying an operator that the signal on the communication line is a voice signal, when said discriminating means discriminates that the signal on the communication line is a voice signal.

5. A data communication apparatus, according to claim 3, further comprising means for sending a voice message in response to detection of the calling signal.

6. A data communication apparatus, according to claim 5, wherein the voice message sets forth that the communication line can be connected to both a data communication terminal and a voice terminal.

7. A data communication apparatus, comprising:
   means for sampling frequency data on a communication line in response to reception of a calling signal from a calling station; and
   means for discriminating whether the calling station is a data communication terminal or a voice terminal, in accordance with a distribution of frequency data obtained by said sampling means,
   wherein said discriminating means discriminates whether or not the calling station is a data communication terminal or a voice terminal, in accordance with a ratio of a number of the frequency data having a particular characteristic to a total number of frequency data obtained by said sampling means.

8. A data communication apparatus, according to claim 7, further comprising means for performing data communication when said discriminating means is unable to determine whether the calling station is a data communication terminal or a voice terminal.

9. A data communication apparatus, according to claim 7, wherein said sampling means comprises a tonal counter for detecting a tonal procedure signal.

10. A data communication apparatus, according to claim 7, further comprising means for summoning an operator when said discriminating means discriminates that the calling station is a voice terminal.

11. A data communication method for use in a called station having a tonal counter which counts a number of times that each of a plurality of frequencies is respectively detected in a received signal and recognizes a tonal signal of procedure signals for data communication, said method comprising the steps of:
    detecting a calling signal from a calling station;
    discriminating a kind of signal present on a communication line, in response to the calling signal;
    determining whether the calling station is a data communication terminal or a voice terminal in accordance with the kind of signal discriminated in said discriminating step by using the tonal counter; and
    repeatedly sending a procedure signal for data communication until the type of the calling station is determined by said determining step, during said determining step,
    wherein, in said determining step, it is determined whether the calling station is a data communication terminal or a voice terminal in accordance with whether a selected one of the numbers obtained by the tonal counter exceeds a predetermined value.

12. A data communication apparatus, according to claim 11, further comprising the step of transmitting a voice message to the calling station in response to the calling signal.

13. A data communication apparatus, according to claim 12, wherein the voice message sets forth that the communication line can be connected to both a data communication terminal and a voice terminal.

14. A data communication method, according to claim 11, further comprising the step of summoning an operator when, in said determining step, it is determined that the calling station is a voice terminal.

15. A data communication method, according to claim 11, further comprising the step of releasing the communication line unless, in said discriminating step, a signal is detected on the communication line during a predetermined period while said discriminating step is in progress.

* * * * *